United States Patent Office 3,282,790
Patented Nov. 1, 1966

3,282,790
ENTERIC COATED TABLET
Richard H. Johnson, Kalamazoo, Mich., assignor to The Upjohn Company, Kalamazoo, Mich., a corporation of Delaware
No Drawing. Filed May 31, 1963, Ser. No. 284,392
8 Claims. (Cl. 167—82)

This application is a continuation of applications Serial Nos. 62,861 and 62,862, both filed on October 17, 1960, and both now abandoned.

This invention relates to an improved enteric coating for medicaments and more particularly to the coating compositions, process of application, and the resultant enteric coating comprising methylcellulose and a member selected from the group consisting of hydrolyzed styrene-maleic anhydride copolymer and cellulose acetate phthalate.

Solid medications for oral administration are provided with coatings for a variety of reasons. For example, a coating will serve as a barrier to a disagreeable taste or odor and provide protection against chipping and breaking. Special types of coatings known as enteric coatings are provided to maintain a coating about the medicinal during its passage through the stomach and are intended to then disintegrate upon reaching the intestine. Cellulose dicarboxylic acid esters have been used to provide this type of enteric coating. However, the use of these cellulosic derivatives entails certain disadvantages. For example, between the applications of the coating solutions to the tablets rotating in the coating pan, talc or similar dusting powder is applied to dry and prevent sticking of the tablets. This use of talc results in a lack of uniformity of the coating from batch to batch of tablets. Further the tablet coating tends to be brittle and inflexible, resulting in fractures or cracks with concomitant loss of integrity as an enteric coating. Without talc, the tablets stick together in the coating pan and the cellulose is not evenly and uniformly deposited upon the tablet surface which results in a lack of uniformity from tablet to tablet.

Similarly, coatings, such as disclosed in United States Patent 2,897,121, of hydrolyzed styrene-maleic anhydride copolymer and talc have afforded advantages as an enteric coating. There are also certain disadvantages that are encountered in the application of the said coating by the air suspension method, e.g. the tendency of the talc to plug a spray nozzle when so blown, and difficulty in the uniform distribution of talc and polymer with consequent lack of uniformity in the coatings.

According to the present invention, it has now been discovered that it is possible to avoid the disadvantages encountered in the use of talc with cellulose acetate phthalate or hydrolyzed styrene-maleic anhydride copolymer while retaining all of the advantages of such use.

According to the present invention it has been discovered that coating compositions comprising solutions of methyl-cellulose and a member selected from the group consisting of hydrolyzed styrene-maleic anhydride copolymer and cellulose acetate phthalate dissolved in a volatile solvent can be applied to solid medicinal dosage forms by conventional methods, i.e., by means of a coating pan, as well as by the newer air suspension method, and can be easily reproduced from lot to lot.

The coatings are deposited as a uniform surrounding layer of homogenously intermixed methylcellulose and said member, which does not obliterate embossing or fail to cover scoring. Further, the application does not require a subcoat or finish coat.

The coatings successfully withstand the acid gastric fluids, yet promptly dissolve in the intestinal tract. The coatings are easily deposited and are of uniform and reproducible quality, which does not alter in its characteristics after aging but remains pliable and resistant to chipping and fracture.

The enteric coatings of the present invention comprise a homogenous mixture of methylcellulose and a member selected from the group consisting of hydrolyzed styrene-maleic anhydride copolymer and cellulose acetate phthalate.

The first principal ingredient of the coating is methylcellulose. As used in the specification and claims the term methylcellulose is used to mean the methyl ether of cellulose containing from about 24% to about 32% of methoxy (—O—CH$_3$) groups; additionally the term is used to include the cellulose derivatives which, in addition to the aforementioned methoxy groups, also contain from about 4% to about 21% of 2-hydroxyproxyl groups. The methylcellulose can be from about 25 to about 90% w./w. of the coating with from about 40 to 80% being preferred.

The second principal ingredient of the coating is a member selected from the group consisting of hydrolyzed styrene-maleic anhydride copolymer and cellulose acetate phthalate. The member selected from the group can be from about 10 to about 75% w./w. of the coating with from about 20 to about 60% preferred.

The first member of the group comprises cellulose acetate phthalate, which is disclosed in U.S. Patent No. 2,093,462. Other film-forming cellulose esters of dicarboxylic acid such as are disclosed in U.S. Patent No. 2,093,464 can also be used in practicing the present invention and are therefore considered equivalents of cellulose acetate phthalate.

The second member of the group comprises hydrolyzed styrene-maleic anhydride copolymer which is more than 70% hydrolyzed. The copolymer can be modified to a minor extent by the presence of some other homopolymerizable ethylenic unit, such as that of acrylonitrile, acrylic acid, methacrylic acid, itaconic acid, vinyl chloride, vinylidene chloride, and the like. As used in the present specification hydrolyzed styrene-maleic anhydride copolymer is meant to include such modifications as well as modifications in the structure and method of preparation which do not alter the essential resinous nature, toxicity and acid properties of the copolymer.

Essentially the copolymers of the present invention can be represented by the following formula:

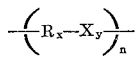

wherein R represents homopolymerizable ethylenic units of which more than 70% are styrene units (the other ethylenic units being those of acrylonitrile, acrylic acid, methacrylic acid, itaconic acid, vinyl chloride, vinylidene chloride, and the like), X represents ethylenic units of maleic acid and maleic anhydride of which more than 50% are maleic acid units (preferably more than 70%), and $x/y$ equals about one (preferably from 1 to about 1.2). The average molecular weight of the copolymer ranges from about 20,000 to about 1,500,000.

Styrene-maleic anhydride copolymer is a commercially available compound. It can be obtained, for example, from the Koppers Company, Inc. in an unmodified form. Resin SC-2 is sold by the Monsanto Chemical Company and is a modified styrene-maleic anhydride copolymer. These copolymers are hydrolyzed to obtain a styrene-maleic acid copolymer which is useful as an enteric material in the present invention. The hydrolysis can be partial or it can be complete and involves a conversion of the acid anhydride linkages to α-dicaroxylic acid units. It is preferred that the hydrolysis be substantially complete, i.e. more than about 70% complete.

E. I. du Pont de Nemours and Company (Grasselli Chemicals Department) sell a product called "G-942" Tanning Agent, which is a partial sodium salt of a hydrolyzed styrene-maleic anhydride copolymer in a 25% water solution. This solution can be used as such; but it is preferred to use the free acid form which can be obtained by precipitation with acid, such as sulfuric or hydrochloric acid, washing the precipitate with water, and drying the product in an oven at 60° C. or in vacuo at room temperature.

Further description of the copolymer, its preparation, and properties can be found in U.S. Patent No. 2,897,121 and the references cited therein.

It is to be understood that, in its broader aspects, the present invention relates to hydrolyzed styrene-maleic anhydride copolymer which is more than 70% hydrolyzed. It includes the material described no matter how it is produced or how it is modified as long as the structure of the copolymer is primarily that of hydrolyzed styrene-maleic anhydride copolymer of the indicated properties and structure.

A preferred adjuvant to be included in the coating is a plasticizer in a concentration of up to 40% w./w., with from 10 to 30% being preferred. The preferred plasticizer is polyethylene glycol 400, although other plasticizers such as the 200, 300, 600, 1000, and 1500 grades of polyethylene glycol can be used as well as propylene glycol and lecithin.

Additional adjuvants which can be added are coloring agents such as the non-toxic dyes, lakes, and pigments which have been certified for use in the food, drug and cosmetic industry; flavoring agents to impart a pleasant taste, such peppermint oil, oil of wintergreen, licorice, and spearmint; sweetening agents such as saccharin and sodium cyclamate; and opacifiers such as titanium dioxide.

The compositions are prepared by dissolving the selected member, methylcellulose, and the selected adjuvants in a suitable volatile solvent; or preferably dissolved in a system of two or more miscible co-solvents. In the preferred co-solvent system a solution is prepared of the cellulose acetate phthalate and one co-solvent such as, methanol, ethanol, isopropanol, dioxane, acetone, ethylene glycol monoethyl ether (Cellosolve) and methyl ethyl ketone, and mixed with a solution of methyl-cellulose and the second co-solvent, such as water, chloroform, methylene chloride, ethylene dichloride, ethylene dibromide, benzyl alcohol, ethylene chlorohydrin formamide, and benzene. When the two solutions of the co-solvents are mixed the remaining ingredients such as plasticizers and colors can be added. The compositions are then ready for application to the solid medicinal dosage forms.

The coatings can be applied using conventional coating apparatus and procedure. For example, tablets can be placed in a standard rotating coating pan and the coating composition can be sprayed onto the tablets or poured over the tumbling tablets from a ladle. Applications of the coating composition can be made from time to time. Removal of the volatile solvents can be facilitated by means of a current of warm air being blown into the pan.

An alternative method of application is the air suspension method. This method and the appropriate apparatus is disclosed by Wurster in U.S. Patent No. 2,799,241 and in the J. A. Ph. A., Scientific edition, August 1959, at page 451. By this method tablets or other solid medicinal dosage forms are suspended and tumbled in a current of air with the coating composition being blown into the system.

The composition of the present invention find their primary application in the coating of tablets. However, additional types of solid material are also suitably coated. For example, hard-filled capsules and soft-gelatin capsules, granules, pilules, and other types can be given a coating. These other types of solid materials are coated in a manner similar to the coating of tablets.

The following examples are illustrative of the processes and products of this invention and are not to be construed as limiting.

Example 1

240 gm. of methylcellulose, 15 cps., is wetted with 1800 cc. of anhydrous 3A alcohol with stirring, 1200 cc. of water is added, and stirring is continued until all of the methylcellulose is in solution. The methylcellulose solution is added to 2400 cc. of an acetone solution of 360 gm. of cellulose acetate phthalate. Add chloroform q.s. ad. to 6000 cc.

To 2000 cc. of this is added 40 cc. of propylene glycol. The resulting fluid has the following composition:

|  | Total w./w. percent nonvolatile solids |
|---|---|
| Cellulose acetate phthalate | 50 |
| Methylcellulose, 15 cps. | 33.3 |
| Propylene glycol | 16.7 |

This fluid is sprayed onto 3.5 kg. of tablets by the air suspension method.

Example 2

420 gm. of methylcellulose, 15 cps., is wetted with 3000 cc. of anhydrous 3A alcohol. With stirring, 2000 cc. of water is added and stirring continued until the methylcellulose is dissolved. To this solution is added 3500 cc. of acetone having 180 gm. of cellulose acetate phthalate dissolved therein. Sufficient chloroform is added to make 10,000 cc. of solution.

To 2500 cc. of the above solution, 60 cc. of polyethylene glycol 400 is added to make the coating solution.

|  | Total w./w. percent nonvolatile solids |
|---|---|
| Cellulose acetate phthalate, 1.8% w./v.-1.8% w./v. | 20.7 |
| Methylcellulose, 15 cps., 4.2% w./v.-4.2% w./v. | 48.3 |
| PEG 400, 2.4% v./v.-2.7% w./v. | 31.0 |

This composition is applied to 3.5 kg. of tablets by the air suspension method, 35.1 mg. of coating is applied per tablet.

Example 3

420 gm. of methylcellulose 28–30% methoxyl, 7–12% hydroxypropoxyl, 50 cps., is wetted with 3500 cc. of anhydrous 3A alcohol. Added 2000 cc. of water and 1000 cc. of chloroform and stirred until dissolved. To this solution is added 2000 cc. of an acetone solution containing 180 gm. of cellulose acetate phthalate. Q.s. ad. chloroform 10,750 cc. To 3000 cc. of the above solution is added 72 cc. of polyethylene glycol 400.

This is applied to 3.5 kg. of tablets by the air suspension method. 33.2 mg. of coating is applied per tablet.

|  | Total w./w. percent nonvolatile solids |
|---|---|
| Cellulose acetate phathalate, 1.67% w./v.-1.67% w./v. | 20.2 |
| Methanol 60 HG-50 cps., 3.90% w./v.-3.90% w./v. | 47.2 |
| PEG 400, 2.40% v./v.-2.70% w./v. | 32.6 |

Example 4

420 gm. of methylcellulose, 50 cps., are wetted with 2700 cc. of anhydrous alcohol and then dissolved in 1000 cc. of water. To the solution is added 270 cc. (304 gm.) of polyethylene glycol 400 and 180 gm. of cellulose acetate phthalate dissolved in 2500 cc. of acetone. Q.s. ad. to 7700 cc. with chloroform.

|  | Total w./w. percent nonvolatile solids |
|---|---|
| Methylcellulose | 46.4 |
| Polyethylene glycol 400 | 33.7 |
| Cellulose acetate phthalate | 19.9 |

1700 gm. of the above solution is diluted with an equal volume of anhydrous 3A alcohol and acetone, 1:1, and sprayed onto 2500 tablets rotating in a coating pan. Each tablet is coated with 40.8 mg. of coating material.

Example 5

105 gm. of methylcellulose, 15 cps., is wetted with 650 cc. of anhydrous 3A alcohol. With stirring 375 cc. of water is added and stirring continued until the methylcellulose is dissolved.

A solution of 45 gm. of cellulose acetate phthalate in 500 cc. of acetone is added to the above. Sufficient solution of anhydrous 3A alcohol:acetone, 1:1, is added to make 2,500 cc. 75 gm. of polyethylene glycol 400 and 300 cc. of chloroform are then added.

| | Total w./w. percent nonvolatile solids |
|---|---|
| Methylcellulose | 56 |
| Cellulose acetate phthalate | 24 |
| Polyethylene glycol 400 | 20 |

This composition was applied to 3.5 kg. of tablets by the air suspension method, 30.4 mg. of coating was applied per tablet.

The disintegration time in U.S.P. simulated gastric juice was as follows:

| | |
|---|---|
| 90 minutes | No change. |
| 130 minutes | Coats of 3 tablets broke. |
| 165 minutes | Coats of 3 tablets broke and 2 disintegrated. |
| 225 minutes | All 6 tablets disintegrated. |

Disintegration time in pH 7.5 buffer was as follows:

| | |
|---|---|
| 13 minutes | All 6 tablets disintegrated. |

Example 6

Coating compositions of the present invention are prepared from the following types and amounts of ingredients:

A

| | Gram |
|---|---|
| Cellulose acetate phthalate | 7 |
| Methylcellulose, U.S.P. 15 cps. | 3 |
| Ethanol | 500 |
| Chloroform | 500 |

B

| | |
|---|---|
| Cellulose acetate phthalate | 1.5 |
| Methylcellulose, U.S.P. 15 cps. | 8.5 |
| Methanol | 450 |
| Chloroform | 380 |
| Water | 170 |

C

| | |
|---|---|
| Cellulose propionate phthalate | 4 |
| Methylcellulose, U.S.P. 15 cps. | 6 |
| Methanol | 450 |
| Chloroform | 380 |
| Water | 170 |

D

| | |
|---|---|
| Cellulose butyrate phthalate | 4 |
| Methylcellulose | 6 |
| Methanol | 450 |
| Chloroform | 380 |
| Water | 170 |

Example 7.—Isolation of styrene-maleic anhydride copolymer

| | |
|---|---|
| Styrene-maleic anhydride copolymer (Dupont G-942 tanning agent) ___kg__ | 20 |
| Sulfuric acid C.P. ___liter__ | 1 |
| Deionized water ___gal__ | 10 |

The copolymer is placed in a mixer and stirred during the slow addition of the sulfuric acid over a period of 90 minutes. The mixture is stirred for 30 minutes after the addition of acid and the 5 gal. of water are added and stirred for an additional 30 minutes. The copolymer is removed by filtration, washed with an additional 5 gal. of water. The copolymer is then removed by filtration, dried in an air dryer for 120 hours at 30–35° C., and then ground to a coarse powder in which form it is suitable for use in the following examples.

Example 8

240 gm. of methylcellulose, 15 cps., is wetted with 800 cc. of anhydrous 3A alcohol. With stirring, 2400 cc. of chloroform is added, and stirring is continued until all of the methylcellulose is in solution. The methylcellulose solution is added to 1946 cc. of anhydrous 3A alcohol solution of 360 gm. of copolymer. Q.s. ad. anhydrous 3A alcohol: chloroform, 3:1, to 6000 cc. To 2000 cc. of this is added 40 cc. of propylene glycol. The resulting syrup has the following composition:

| | Total w./w. percent nonvolatile solids |
|---|---|
| SYMA copolymer | 50 |
| Methylcellulose, 15 cps. | 33.3 |
| Propylene glycol | 16.7 |

This anhydrous syrup was sprayed onto 3.5 kg. of placebo tablets by the air suspension method. 35.3 mg. of coating was applied per tablet. This coating was found to be .0064 inch thick on the edge and .0062 inch thick on the side. The disintegration time of the coating was greater than 218 minutes in simulated gastric juice and 6 minutes in pH 7.5 buffer.

$$\text{Ratio} = \frac{>218}{6} = \frac{>39.6}{1}$$

J. G. Wagner reported ratios of 17.8 and 12.2 for SYMA-talc-di-n-butyl phthalate coating. (See Enteric Coating III, J. Amer. Pharm. Assoc., Sci. Ed., 49, 121–127 (1960) No. 3.)

In the foregoing procedure Methocel 60–HG, 50 c.p.s., a methylcellulose having 27–29% methoxyl and 5–7% hydroxypropoxyl groups, can be substituted for the methylcellulose, 15 c.p.s., of the example.

Example 9

420 gm. of methylcellulose, 15 c.p.s. is wetted with 2500 cc. of anhydrous 3A alcohol. With stirring, 1500 cc. of water is added and stirring continued until the methylcellulose is dissolved. To this solution is added 750 cc. of 3A alcohol solution of 180 gm. of copolymer. Q.s. ad. anhydrous 3A alcohol to 6000 cc., then added 4000 cc. of 80% aqueous 3A alcohol to 10,000 cc.

To 2500 cc. of the above solution is added 60 cc. of polyethylene glycol 400. The resulting syrup has the following composition:

| | Total w./v. percent nonvolatile solids |
|---|---|
| SYMA copolymer, 1.8% w./v.-1.8% w./v. | 20.7 |
| Methylcellulose 15 c.p.s., 4.2% w./v.-4.2% w./v. | 43.2 |
| PEG 400, 2.4% w./v.-2.7% w./v. | 31.2 |

This syrup was applied to 3.5 kg. of placebo tablets by the air suspension method. 35.1 mg. of coating was applied per tablet. The disintegration time of the coating in simulated gastric juice was greater than 180 minutes. All six tablets were swollen but none of the coats were broken. The disintegration time in pH 7.5 buffer was 8 minutes.

$$\text{Ratio} = \frac{>180}{8} = \frac{>22.5}{1}$$

In the foregoing procedure Methocel 60–HG, 50 c.p.s., a methylcellulose having 27–29% methoxyl and 5–7% hydroxypropoxyl groups, can be substituted for the methylcellulose, 15 c.p.s., of the example.

Example 10

420 gm. of Methocel 60–HG, a methylcellulose having 27–29% methoxyl and 5–7% hydroxypropoxyl, 50 c.p.s., is wetted with 3500 cc. of anhydrous 3A alcohol. 1000 cc. of water and 3000 cc. of chloroform are added and stirred until dissolved. To this solution is added 750 cc. of a 3A alcohol solution containing 180 gm. of copolymer. Q.s. ad. anhydrous 3A alcohol 10,750 cc. To each 3000 cc. is added 72 cc. of polyethylene glycol 400. The resulting syrup has the following composition:

|  | Total w./v. percent nonvolatile solids |
|---|---|
| SYMA, 1.67% w./v.-1.67% w./v. | 20.2 |
| Methocel 60–HG, 50 c.p.s., 3.90% w./v.-3.90% w./v. | 47.2 |
| PEG 400, 2.40% v./v.-2.70% w./v. | 32.6 |

The composition was applied to 3.5 kg. of placebo tablets by the air suspension method. 33.2 mg. of coating was applied per tablet. The disintegration time in simulated gastric juice was greater than 300 minutes. All six tablets were very swollen, but the coat was intact. These tablets were then placed in pH 7.5 buffer where they disintegrated in 5 minutes. The disintegration time in pH 7.5 buffer without pretreatment in simulated gastric juice was 10 minutes.

$$\text{Ratio} = \frac{\geq 300}{5} = \frac{\geq 60}{1}$$

In the foregoing procedure methylcellulose, 15 c.p.s., can be substituted for the Methocel 60–HG, 15 c.p.s., of the example.

*Example 11*

420 gm. of methylcellulose, 50 c.p.s., are wetted with 2700 cc. of anhydrous alcohol and then dissolved in 3700 cc. of chloroform. To the solution is added 270 cc. (304 gm.) of polyethylene glycol 400 and 180 gm. of hydrolyzed styrene-maleic anhydride copolymer making 7700 cc. of coating. The resulting syrup has the following composition:

|  | Total w./w. percent nonvolatile solids |
|---|---|
| Methylcellulose, 50 c.p.s. | 46.4 |
| Polyethylene glycol 400 | 33.7 |
| Hydrolyzed styrene-maleic anhydride copolymer | 19.9 |

1700 gm. of the above solution were diluted with an equal volume of anhydrous 3A alcohol and sprayed onto 2500 placebo tablets rotating in a coating pan. Each tablet was coated with 40.8 mg. of coating material.

Disintegration time (USP method)
  Simulated gastric juice (pH 1.2):
    150 minutes—All tablets swollen, but the coatings still intact.
  pH 7.5 buffer
    29 minutes—All tablets passed through the screen.

In the foregoing procedure Methocel 60–HG, 50 c.p.s., a methylcellulose having 27–29% methoxyl and 5–7% hydroxypropoxyl groups, can be substituted for the methylcellulose, 15 c.p.s., of the example.

What is claimed is:

1. A solid medicinal dosage form surrounded by an enteric coating, said coating comprising homogenously intermixed methylcellulose and a member selected from the group consisting of hydrolyzed styrene-maleic anhydride copolymer and cellulose acetate phthalate, said methylcellulose having a concentration of from about 25 to about 90% of said coating and said member having a concentration of from about 10 to about 75% of said coating.

2. The composition of claim 1 wherein the said coating contains up to 40% of a plasticizer.

3. A solid medicinal dosage form surrounded by an enteric coating, said coating comprising homogenously intermixed methylcellulose and hydrolyzed styrene-maleic anhydride copolymer, said methylcellulose having a concentration of from about 40 to about 80% of said coating and said hydrolyzed styrene-maleic anhydride copolymer having a concentration of from about 20 to about 60% of said coating.

4. The composition of claim 3 wherein the said coating contains up to 40% of a plasticizer.

5. A solid medicinal dosage form surrounded by an enteric coating, said coating comprising homogenously intermixed methylcellulose and cellulose acetate phthalate, said methylcellulose having a concentration of from about 40 to about 80% of said coating and said cellulose acetate phthalate having a concentration of from about 20 to about 60% of said coating.

6. The composition of claim 5 wherein the said coating contains up to 40% of a plasticizer.

7. A process for producing a solid medicinal dosage form protected by an enteric coating which includes the step of coating said dosage form with a solution of methylcellulose and hydrolyzed styrene-maleic acid copolymer and a volatile solvent wherein the ratio of solutes is 1 part of methylcellulose to from 0.2 to 2 parts of hydrolyzed styrene-maleic anhydride copolymer.

8. A process for producing a solid medicinal dosage form protected by an enteric coating which includes the step of coating said dosage form with a solution consisting essentially of methylcellulose, cellulose acetate phthalate, and a volatile solvent and wherein the ratio by weight of solutes is 1 part of methylcellulose to from 0.2 to 2 parts of cellulose acetate phthalate.

References Cited by the Examiner
UNITED STATES PATENTS

| 2,478,182 | 8/1949 | Consolazio | 167—82 |
| 2,897,121 | 7/1959 | Wagner | 167—82 |
| 3,043,782 | 7/1962 | Jensen | 167—82 |
| 3,080,294 | 3/1963 | Shepard | 167—82 |

JULIAN S. LEVITT, *Primary Examiner.*

LEWIS GOTTS, *Examiner.*

G. A. MENTIS, *Assistant Examiner.*